J. S. MANTON.
CLUTCH CONTROLLER.
APPLICATION FILED JUNE 23, 1919.

1,437,605.

Patented Dec. 5, 1922.
5 SHEETS—SHEET 2.

Witnesses:
W. P. Kilroy
Harry P. L. White

Inventor:
James S. Manton
By Brown, Boettcher & Riemer
Attys.

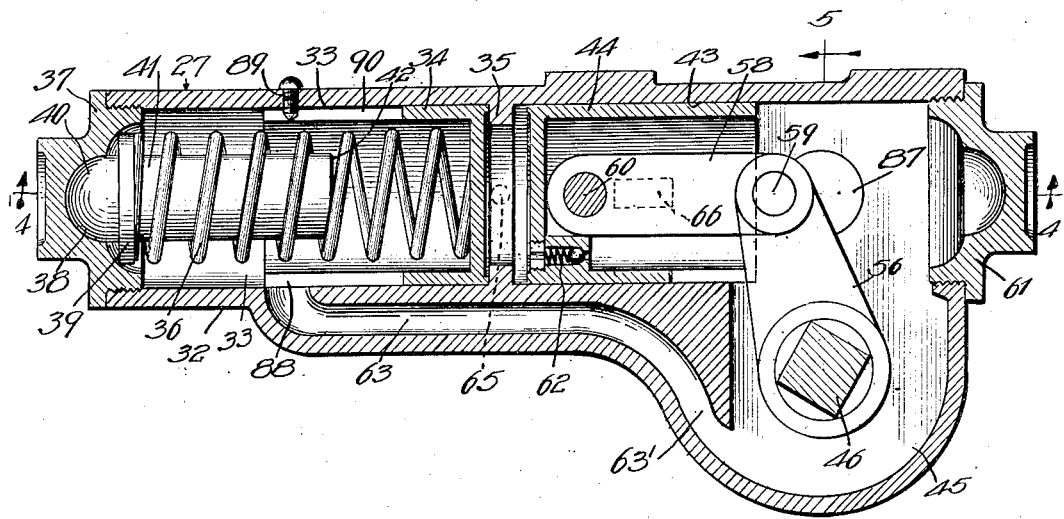
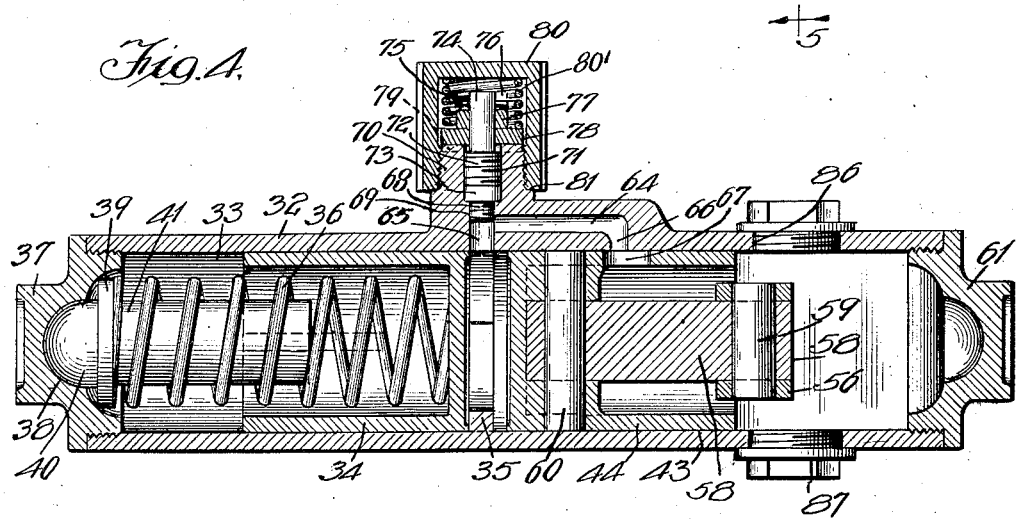
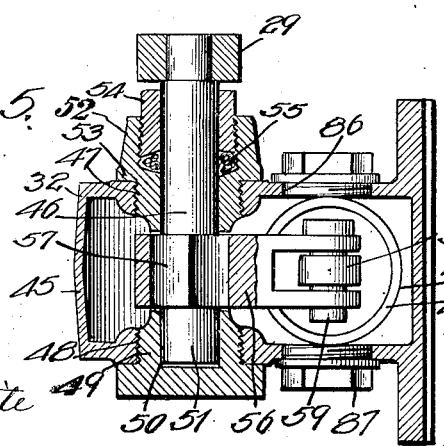

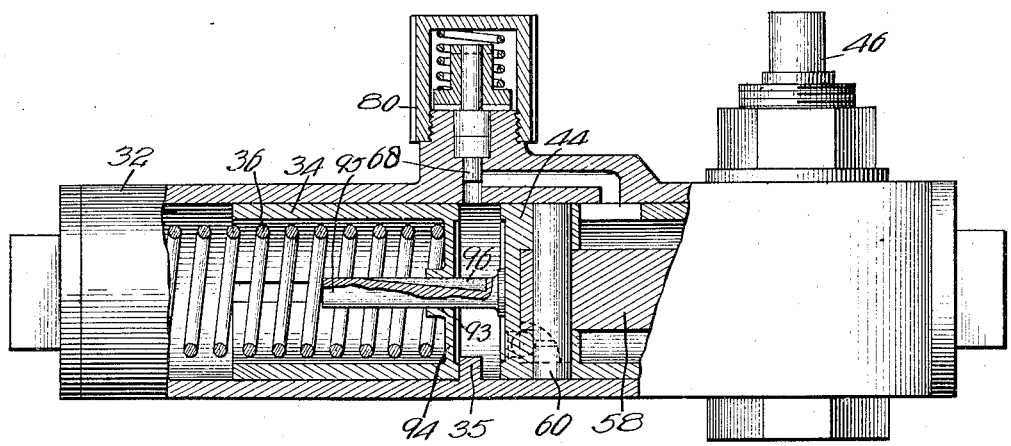
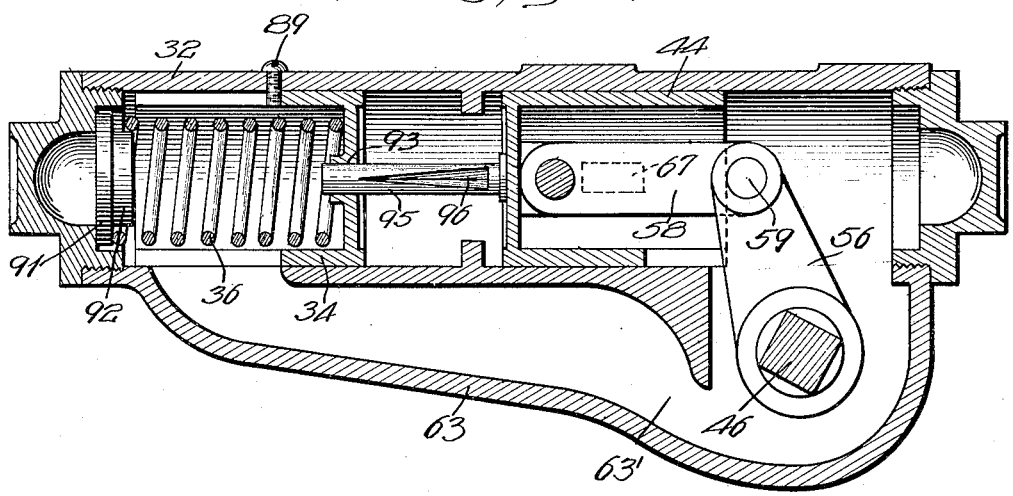

Patented Dec. 5, 1922.

1,437,605

UNITED STATES PATENT OFFICE.

JAMES S. MANTON, OF CHICAGO, ILLINOIS.

CLUTCH CONTROLLER.

Application filed June 23, 1919. Serial No. 305,963.

*To all whom it may concern:*

Be it known that I, JAMES S. MANTON, a citizen of the United States, residing at Chicago, in the county of Cook and State of Illinois, have invented a certain new and useful Improvement in Clutch Controllers, of which the following is a full, clear, concise, and exact description, reference being had to the accompanying drawings, forming a part of this specification.

My invention relates to improvements in clutch controllers for controlling the engagement of power transmission clutches on automobiles and the like.

It is customary to employ a friction clutch on an automobile between the internal combustion engine and the driving mechanism for the purpose of connecting and disconnecting the power to drive or stop the automobile.

In the operation of an automobile especially in crowded thoroughfares and in other situations where it is necessary to drive slowly or stop frequently, it is customary to engage and disengage the clutch to control the speed of the automobile.

The clutch is usually disengaged by a foot lever and is engaged by a strong clutch spring, and the usual manner of running slow is to oppose the clutch spring by pressure on the lever and by easing up on the lever permit the clutch to cause the engagement of the clutch.

It usually takes considerable experience before a driver can effect this engagement without a shock or jerk, and even with the most careful driving it is difficult for even an experienced driver to avoid entirely any unpleasant shock or jerk upon every engagement of the driving clutch.

It is my object to provide a control mechanism which will eliminate the personal element in engaging the clutch and will permit the instantaneous disengagement of the clutch; which will operate to re-engage the clutch automatically and quickly and in such a manner as to eliminate all shocks, jars or jerks; which shall be so constructed that once installed it will remain in proper working condition with a minimum of attention; and which shall be equipped with simple means for regulating the speed or rate of engagement of the clutch parts to effect such engagement in a smooth, easy and quick manner.

For the purpose of giving a clear understanding of my invention, attention is directed to said accompanying drawings, in which:

Figure 3 is an enlarged horizontal section of the controller on the line 3—3 of Figure 1;

Figure 4 is a central section of the control cylinder on the line 4—4 of Figure 3;

Figure 5 is a cross section of the controller on the line 5—5 of Figure 3;

Figure 6 is a detail plan section on the line 6—6 of Figure 1;

Figure 12 is a detail plan view of two connection plates; and

Figures 13 and 14 are views similar respectively to Figures 3 and 4 illustrating slight modifications of my invention.

Figure 1:
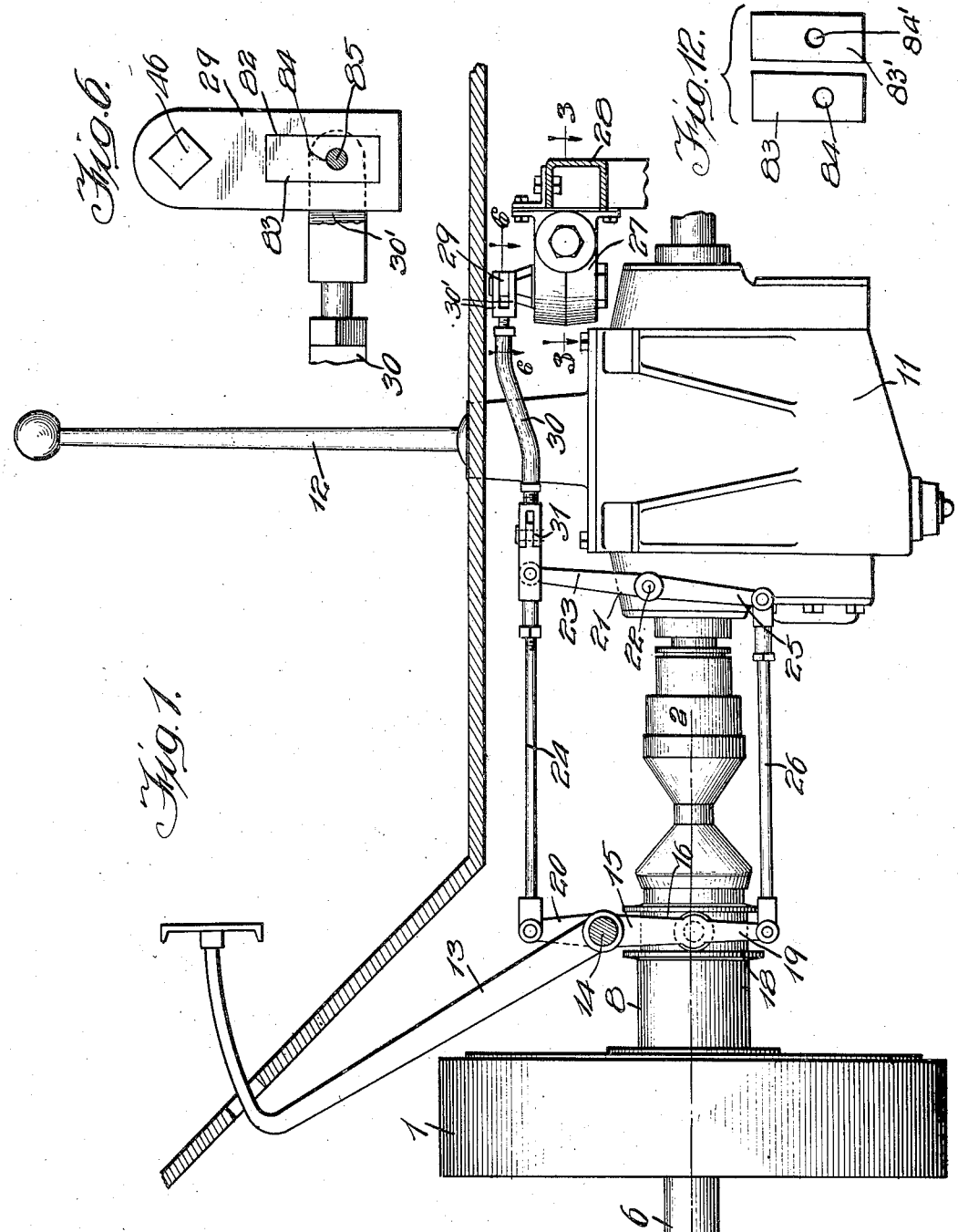
Figure 1 is a fragmentary side elevational view of an automobile power transmission and control mechanism equipped with a clutch control embodying my invention.

According to my invention I provide a controller spring to counterbalance or oppose the clutching action of the main clutch spring. I interpose a variable liquid piston between these two springs, I arrange the controller so that substantially no resistance is offered to the quick opening of the clutch and I automatically control the action of the interposed liquid piston upon the closing of the clutch so as to oppose practically no counterbalancing force to the closing action of the main spring until the clutch part has been brought nearly into engaging relation, at which time I neutralize or completely counterbalance the main spring, and then I gradually reduce the counterbalance and gradually allow the main spring to force the co-operating clutch parts into firm and solid engagement until finally the main clutch spring sets the clutch parts together with its full and unbalanced pressure.

The action above outlined results in the free and unhindered disengagement of the clutch and the quick closing of the clutch upon the release of the foot lever to the point where the clutch parts are brought into initial contact with each other and the final driving engagement of the clutch parts being effected automatically and with such a gradual though quick application of pressure from substantially no pressure to full pressure that the engagement is effected smoothly and without shock, though accomplished very quickly.

This present invention is an improvement and a further development and refinement of my earlier invention described and claimed in my patent on clutch controller No. 1,310,199, issued July 15, 1919.

In said drawings 1 represents the fly wheel of an automobile engine having a coned clutch surface 2. The co-operating coned clutch member 3 is adapted to be held pressed into driving contact with the surface 2 by the main clutch spring 4. The spring 4 is interposed between an anti-friction collar 5, caried by the free end of the engine shaft 6, and the inner end 7 of a longitudinally movable sleeve 8 which surrounds the free end of the shaft and encloses the spring 4.

The outer end of the sleeve 8 is rotatably connected with and slidably mounted upon the forward end of the transmission shaft 9, being connected thereto through the medium of a suitable universal joint connection 10.

The transmission shaft 9 connects with a suitable transmission mechanism contained within the casing 11, and is adapted to be controlled by a suitable lever 12.

Under normal driving condition the main clutch spring 4 holds the co-operating clutch parts in contact, that is, in power transmitting relation or condition.

To compress the main spring and to separate the co-operating clutch parts to disconnect the power, a foot lever 13 is provided rigidly mounted on a transverse shaft 14 rotatably mounted in suitable bearings on the frame of the automobile and extending transversely over the rear end of the sleeve 8. I provide a yoke 15 pivotally mounted on the shaft 14 and having depending arms 16, the lower free ends 17 of which enter a groove 18 provided in the periphery of the sleeve 8 for engaging the sleeve to move it back and thus compress the spring 4, and disengage the clutch parts. The yoke has a downwardly extending arm 19 and I operatively connect the free end of this arm 19 with the shaft 14 in such a manner as to obtain a very powerful or multiplied control of the spring 4. This connection comprises a vertical arm 20 rigidly mounted on the shaft 14, a swinging lever 21 pivotally mounted between its ends on a pivot 22 carried by the casing 11, the upper end 23 of the lever 21 being linked to the free end of the arm 20 by the adjustable link 24 and I link the lower end 25 of the lever 21 to the free end of the arm 19 by the adjustable link 26.

I arrange the proportional lengths of the several arms and levers so that I permit a relatively long movement of the foot lever 13 and reduce this to a very small operating movement of the sliding sleeve 8, thus greatly multiplying the force applied to disengage the clutch and permitting the very easy opening of same.

I arrange my automobile clutch controller 27 above the rear portion of the transmission case 11 and secure it to a cross bar 28 forming part of the automobile frame. I arrange it in such position as to connect the free end of its operating crank 29 with the rear end of the link 24 by means of an adjustable extension link 30. As the crank 29 swings in a horizontal plane and the arm 20 on the shaft 14 in a vertical plane, I provide a pivoted joint 31 connecting the extension link 30 to the link 24 to permit the free operation of the connected parts without binding.

My controller consists of a casing 32 in which I enclose and seal all of the working mechanism thereof. This casing contains a longitudinal cylindrical bore 33, in one end of which I arrange a movable piston head 34. The piston 34 snugly fits the bore 33 and is normally held at the inner limit of its movement against a stop 35 by a relatively strong spring 36, which I mount between the piston head 34 and the head 37 by which I close the outer end of the cylinder. I make the spring 36 in the form of a straight cylindrical coil, which is the most simple and most durable form of spring, and I flatten the ends of the outer coils to provide flat end contact surfaces. It is difficult, however, to make the two ends of the coil absolutely parallel and thus to avoid any side strain or undue friction, and to minimize this and to allow for lack of parallellism of the ends of the spring I provide a seating for the outer end of the spring which can adjust itself to any variation from true parallel relation. This seating consists of a central spherical socket 38 in the inner face of the head 37, and a seating washer or collar 39 for the outer end of the spring, the washer having a spherical projection or bearing 40 on its outer surface adapted to seat in the spherical socket 38. On the inner face of the washer or collar 39 I provide a cylindrical projection 41 extending within the coils of the spring 36 and adapted to retain the same in central position upon the collar 39.

In the opposite end of the casing 32 I provide a cylindrical bore 43 of the same diameter as the bore 33 and in alignment therewith, and I provide a piston 44 movable in this bore and snugly fitting same. At this end of the casing I provide a lateral enlargement 45 in which I mount a shaft 46, upon the outer end of which I rigidly mount the crank arm 29. For mounting this shaft in the casing I provide two aligned threaded bores 47 and 48, in the lower and upper walls respectively of the casing, and I close the lower bore by a threaded plug 49 having a central bearing socket 50 for receiving and rotatably mounting the lower end 51 of the shaft 46. I close the upper bore by an externally threaded sleeve member 52 having a circumferential collar 53 adapted to contact with the outer surface of the casing and provided with a central bore for receiving the shaft 46 and provided with a threaded gland nut 54 for compressing packing 55 around the shaft 46 to prevent the escape of the oil with which I fill the casing. Within the casing and between the two closures I mount a crank arm 56 on the shaft 46 providing a square portion 57 on the shaft and providing the crank 56 with a square hole for fitting same, so that the arm will be swung with the rotation of the shaft. This arm is for moving the piston 44 and for this purpose I provide a link 58 pivotally connected by a pin 59 to the free end of the crank arm 56 and pivotally connected by the pin 60 to the piston 44. The arm 56 can swing back and forth a limited distance within the casing and thus move the piston 44 back and forth within the cylinder. I close the end of the casing beyond the arm 56 by means of a threaded head 61 similar to the head 37 at the opposite end of the casing. I operatively connect the two pistons through the medium of a variable liquid piston. I do this by filling the casing 32 substantially full of oil, so that upon every movement of either of the pistons a movement of the oil in the casing is produced.

Figure 2:
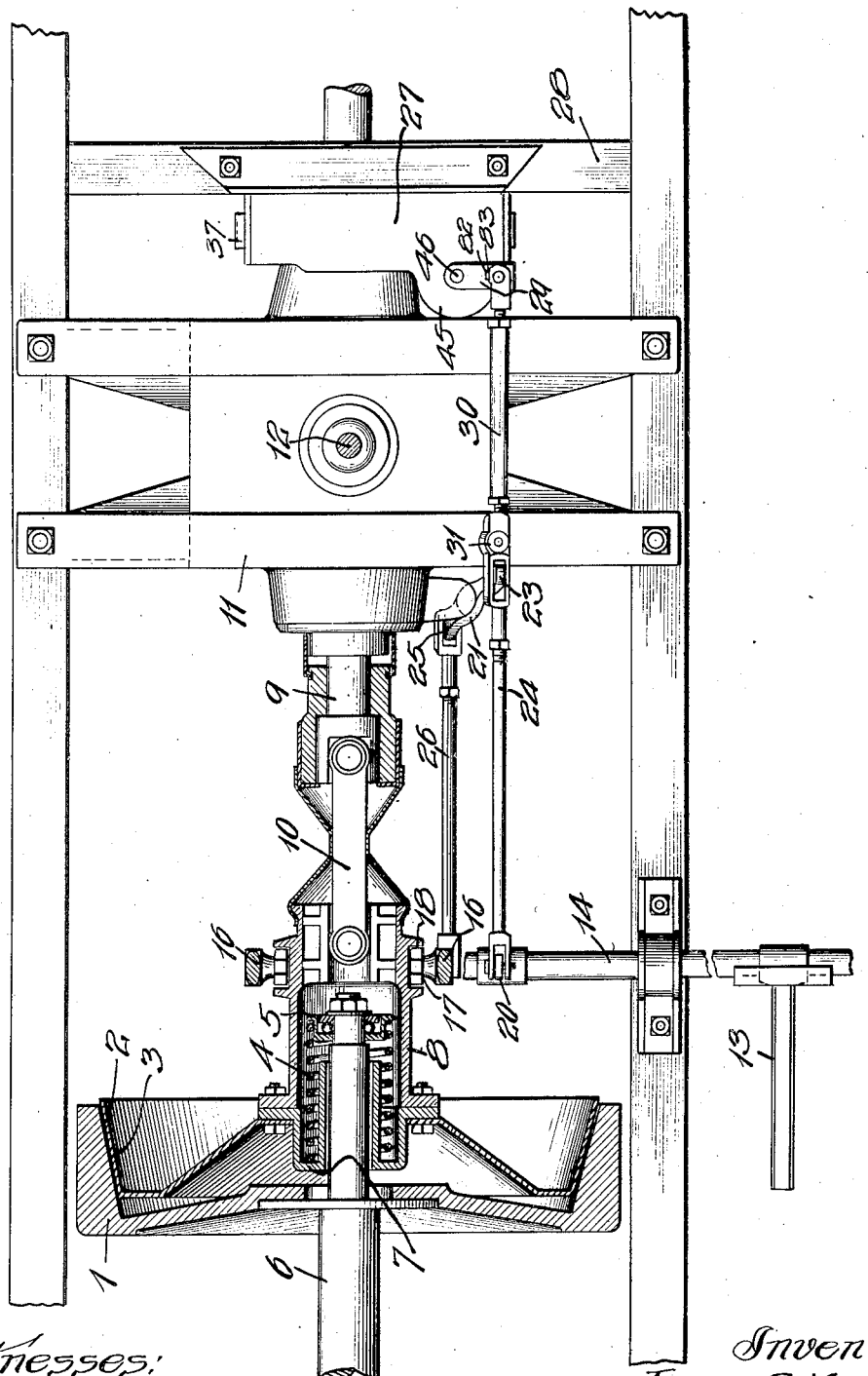
Figure 2 is a fragmentary plan view of said mechanism shown partly in section on the line 2—2 of Figure 1.

When it is desired to disconnect the power from the transmission, the clutch being engaged as shown in Figures 1 and 2, the spring 4 is compressed and the two co-operating clutch parts are separated by a push forward by the foot on the operating clutch control lever 13. When this occurs the extension link 30 rotates the shaft 46 of the controller 27 and draws the piston 44 outwardly or away from the piston 34. To permit the free withdrawal of the piston, I provide a spring held check valve 62 in the piston head 44 which allows the oil to flow freely through the piston from the back to the front, but does not allow the oil to flow in the reverse direction.

Figure 7:
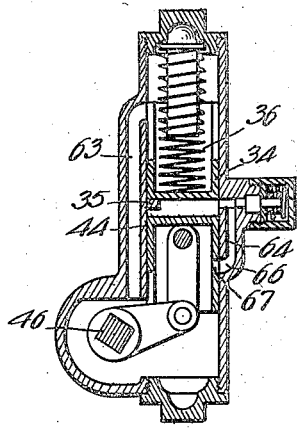
Figures 7, 8, 9, 10 and 11 are diagrammatic sectional views of the control cylinder illustrating the operation of the controller.
Figure 8:
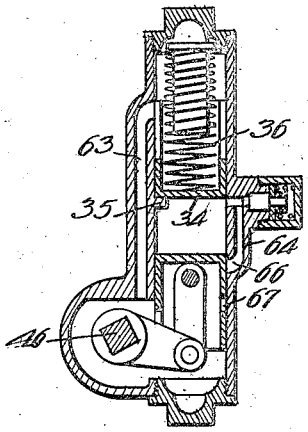
Figure 9:
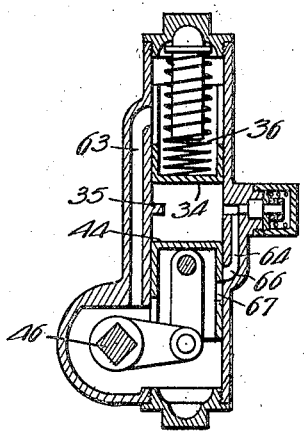

In the several Figures 7 to 11 inclusive, Figure 7 shows the position of the several parts of the controller at the time of the normal running or engaged condition of the clutch, viz: the piston 34 seated against the stop 35 and the piston 44 at the inner limit of its movement and having its inner end close to said stop. Figure 8 shows the working piston 44 at the outer limit of its movement in the position which it occupies when the foot lever 13 is pushed clear down to separate the clutch parts against the closing force of the main clutch spring 4. At this time the oil from behind the piston 44 has been displaced through the valve port controlled by the check valve 62 to a position between the two pistons. It will now be clear that an inward movement of the piston 44 which will be caused by the action of the main clutch spring as soon as the lever 13 is released, will transmit motion to the piston 34 through the medium of the liquid piston which fills the space between the two pistons. This inward movement of the piston 44 and the consequent outward movement of the piston 34, will be opposed by the spring 36 which is compressed by the outward movement of the piston 34, but this is not sufficient to materially retard the inward movement of the piston 44 or the approach of the movable clutch cone 3 toward the opposed clutch cone until the cooperating clutch parts are brought so close together that they are substantially in contact though not pressed together with sufficient pressure to transmit power. In other words, at this point, the two clutch parts are in initial contact but are slipping. The oil which fills the casing back of the piston 34 does not affect or retard this outward movement of the piston 34, as I provide a relatively large by-pass 63 connecting with two ends of the casing and permitting the oil back of the piston 34 to flow freely around to the space back of the piston 44, so that the only opposition to the inward movement of the piston 44, from the position shown in Figure 8, is the compression spring 36, that is, until, as explained, the piston 44 has moved to a point corresponding to the initial contacting of the two clutch parts. This occurs, of course, before the piston 44 has reached the inner limit of its movement. As this portion of the return movement of the movable clutch part is the major portion of its movement and is not hindered to any great extent by the controller it occurs almost instantaneously but during this movement the spring 36 has increased rapidly in resistance by compression, until when this point is reached the spring 36 offers enough resistance to prevent the working engagement of the clutch parts and the rate of movement of the movable part towards its co-operating part is greatly reduced. From this point on I provide a gradual reduction of the resistance to the main spring which I have accumulated by the compression of the spring 36, For this purpose I provide a small by-pass 64 connecting the space between the two pistons with the space back of the working piston 44. This by-pass enters the space between the two pistons at 65 in alignment with the stop 35 and connects with the casing for delivering oil back of the piston 44, at 66, which is far enough removed from the stop 35 so that it cannot be uncovered by the piston 44 at the outer limit of its movement. This inner position of the piston 44 above referred to is shown in Figure 9.

Figure 10:
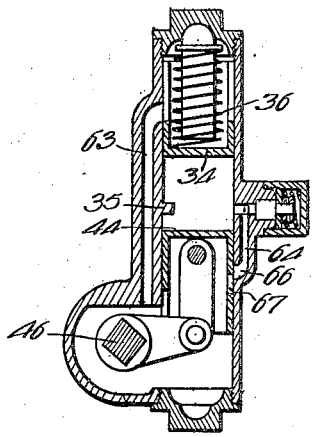
Figure 11:
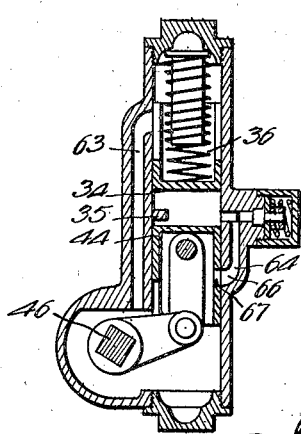

For controlling the by-pass 64 I provide an elongated port 67 in the side wall of the piston 44, and adapted to begin to uncover the port 66 at the time that the two clutch parts are brought into initial contact. I so proportion the strength of the spring 36 that at such time the clutch parts cannot be engaged by sufficient pressure to practically transmit power without permitting the piston 34 and the piston 44 to approach each other. This I accomplish by permitting the oil which is between the two pistons to by-pass around the piston 44 through the passage 64 and as permitted by the uncovering of the port 66 by the piston port 67. As the oil escapes from between the pistons the piston 34 is pushed inwardly toward the piston 44 thus reducing the force of the spring 36 and the counterbalance to the clutch spring 4 and permitting the graduated engagement of the clutch parts and gradual forcing of the piston 44 to the inner limit of its movement. This interim or graduated condition or stroke is illustrated in Figure 10, wherein the piston 44 is shown as having nearly reached the inner limit of its movement and the piston 34 as having moved in part way toward the stop 35. As the oil continues to by-pass around the piston 44 from the space between the pistons, the two pistons continue their movement inwardly until the piston 34 finally seats against the stop 35 and consequently its resistance to the movement of the piston 44 is nil and at substantially the same instant the piston 44 is forced to the inner limit of its movement and the clutch parts are finally seated or forced together with the full and unresisted pressure of the clutch spring 4.

To prevent the projection of the oil thru the by-pass 63 and into the crank space 45 of casing 32 effecting the operation of the piston 44 by impinging against the crank arm 56, I deflect the outlet end 63' of the passage 63 outwardly as shown.

In order to be able to adjust the controller so that it will properly co-operate with clutch springs of different strengths and with clutch moving levers having different proportional movements, I provide means for conveniently adjusting the flow of oil through the by-pass 64 and I also provide simple means for adjusting the application of motion to the operating shaft 46.

The by-pass adjustment comprises an adjustable screw plug 68 screwed into the threaded opening 69 and its inner end adapted to project into and close the by-pass 64 as illustrated in Figure 4. For this purpose I provide a boss 70 on the casing 32 having a central threaded bore 71 in alignment with the hole 65 and larger in diameter than the plug 68. In this larger bore I provide a threaded bushing 72 adapted to compress suitable packing 73 around the plug 68 to prevent any escape of oil at this point from the casing. The outer end 74 of the plug 68 projects beyond the outer end of the boss 70, and I provide means for screwing the plug 68 out and in for adjusting it, comprising a pin 75 projecting transversely through the outer end of the plug 68 and engaged in a slot 76 in a sleeve 77 surrounding the body of the plug and ending in a collar 78 at its inner end which seats on the outer end of the boss 70. The contacting faces of the boss and the collar are provided with inter-engaging radial ribs 79 to hold the sleeve and the plug in adjusted position. I preferably seal or cover this by-pass adjustable mechanism by means of an internally threaded cover cap 80 adapted to fit the outer cylindrical surface of the boss 70 which I co-operatively thread. I firmly seat the inner end of the cap against the shoulder 81 at the base of the boss to hold the cap tightly against loss. To prevent the cap 80 from becoming loosened and for holding the collar firmly seated upon the outer end of the boss, I provide a compression spring 80' surrounding the sleeve 77 within the cap 80 and seated at its inner end on said collar and at its outer end against the inner surface of the outer end of the cap.

To provide for the adjustment of movement so that the piston 44 will be properly reciprocated by the necessary movement of the foot lever for opening and closing the clutch, I provide a slot 82 extending longitudinally in the outer end of the crank arm 29, as best shown in Figure 6, and I provide a suitable plate 83 adapted to nicely fit within and to fill this slot. This plate filler has a hole 84 to receive the pin 85 with which the extension link 30 is connected to the crank arm 29. It is obvious that by using different filler plates 83 having holes 84 at different points longitudinally thereof, as best illustrated in Figure 12, I can lengthen or shorten the operating length of the crank arm 29, so that by lengthening or shortening the adjustable links 24 and 30 I can cause the piston 44 to reciprocate properly to accomplish the purpose of the invention. In this figure, plate 83' illustrates the hole 84' centered at a different point, and it is obvious that any number of these plates having holes 84' variously centered will provide an adjustment within a wide range. The plate 83 is held in place by the upper and lower jaws 30' of the bifurcated rear end of the link 30.

By means of this very simple form of adjustment I am enabled to, in effect, adjust the counterbalancing action of the spring 36 without the necessity of opening the casing 32 for it is evident that I can adjust the extent of the reciprocating movement of the piston 44 by changing the length of the crank arm 29. By reducing the extent to which the movement of the leverage system draws the piston 44 outwardly, I will, in like manner, reduce the compression of the spring 36 by the equally reduced inward movement of the piston. Having adjusted the length of the crank arm 29 to produce the counterbalancing effect desired in the particular installation, I can then, by adjusting the length of the extension connecting link 30 cause the piston port 67 to properly register with the by-pass port 44, and all without the necessity of opening the casing 32.

For convenience in assembling the pin 59 and for filling and emptying the casing 32 I provide openings 86 in the upper and lower walls of the casing adjacent to the pin 59 and I close the openings by screw plugs 87.

I preferably make the cylindrical wall of the piston 34 extra long to avoid any tipping or friction and I provide it with a longitudinal slot 88 in its side wall long enough so that the by-pass 63 will not be covered at any time. To hold the piston 34 with the slot 88 in registry with the by-pass 63, I provide a guide pin 89 in the form of a screw projecting thru the cylinder wall, its inner end entering a guide slot 90 in the cylindrical wall of the piston.

The rotatable or oscillating shaft 46 is the only operative or working part which enters the casing and consequently the stuffing box surrounding the shaft is the only working joint that has to be packed. This packed joint produces very little friction, as the shaft 46 merely oscillates back and forth and does not reciprocate longitudinally. Consequently, the casing, once filled with oil, remains full, as the only possible leakage is around the shaft 46 and the possibility of leakage at this point is reduced to a minimum, furthermore the pressure of the oil in the casing, where the shaft enters, practically never rises above atmospheric pressure, as the oil pressure which I make use of is confined to the oil between the two pistons, and there is no moving part which enters this space thru the casing wall and which has to be packed.

In Figures 13 and 14 I have shown the by-pass 63 as of sufficient area to reduce to a minimum or eliminate altogether all resistance to the flow of oil from behind the piston 34 to the opposite end of the casing 32. In consequence of this substantially no resistance is added to the resistance of the spring 36 to the inward movement of the piston 44 upon the release of the foot lever 13 when it is desired to throw in the clutch. In this form of my device I illustrate a simple flat washer 91 for the outer end of the spring 36 and provided with a short central projection 92 for centering the spring thereon. It is obvious that I can readily adjust the tension of the spring 36 by use of washers of different thicknesses.

As explained, the by-pass 64 and the valve 68 by which said by-pass can be adjusted are for the purpose of regulating the speed or rate at which the oil escapes from between the pistons 34 and 44 to permit the final operative contacting of the driving clutch elements. It is desirable to have the capacity of this by-pass so adjusted as to prevent the operative engagement of the clutch parts and yet to permit their quickly entering into operative engagement once they have been brought into initial contact. To effect this function and to reduce the time between the instant of initial engagement and final operative engagement, I provide means for increasing the by-pass area as the piston 34 approaches its inner limit of movement and seats upon the stop 35. In the form illustrated this consists of a central hole 93 in the inner end 94 of the piston 34, which forms a guide for and is filled by a central stem 95 carried by the piston 44. The stem 95 prevents the flow of oil through the hole 93. I then provide a graduated by-pass 96 comprising a long tapered V-groove in the stem 95, larger adjacent to its base and disappearing entirely short of the free end of the stem. This groove thus provides, at times, a passage through which the oil can escape from between the pistons and permit the pistons to approach each other. As shown in Figure 13 when the piston 34 is at the outer limit of its movement no oil can escape through the piston head, but as the piston 34 approaches the inner limit of its movement, as best shown in Figure 14, the by-pass produced by the groove 96 has increased to such an extent that there is substantially no resistance offered to the quick seating of the piston 34 against the stop 35 and thus eliminating all spring resistance to the main spring 4 and also there is at this time substantially no resistance offered to the inward movement of the piston 44 under the influence of the main spring 4, thus permitting the almost instantaneous operative engagement of the clutch elements, once they have been brought into initial engagement. While the word instantaneous is used, it should be understood that the time interval between initial engagement and operative engagement, though short, yet has some duration, and during this short interval the application of the pressure of the main spring to the clutch elements is so nicely regulated and so gradual that it is a practical impossibility to produce a shock or jar in such operation.

As it is obvious that many modifications of my invention will readily suggest themselves to one skilled in the art, I do not limit or confine my invention to the specific structures herein shown and described, except within the scope of the appended claims.

I claim:

1. In a clutch controller for use with a clutch having cooperating clutch elements normally held in cooperative relation by pressure means and adapted to be released against the action of said pressure means, the combination of a casing adapted to contain an operating fluid, such casing having a cylindrical bore, an operating piston in one end of the bore, a spring pressed piston in the other end of the bore, a check valve permitting the free outward movement of the operating piston, and preventing the escape of fluid from between the pistons on the inward movement of the operating piston, a shoulder for limiting the inward movement of the spring pressed piston, a by-pass for permitting the escape of the fluid from between said pistons, a port in said operating piston controlling said by-pass and preventing the escape of fluid from between said pistons until said operating piston has nearly reached the inner limit of its movement whereby the fluid between the pistons is placed under pressure and the inward movement of the operating piston is opposed.

2. In a clutch controller for use with a clutch having cooperating clutch elements normally held in cooperative relation by pressure means and adapted to be separated against the pressure of said pressure means to release the clutch, the combination of a casing adapted to contain an operating fluid, said casing having a cylindrical bore, an operating piston in one end of the bore, a spring pressed piston in the other end of the bore, a check valve permitting the free outward movement of the operating piston, and preventing the escape of fluid from between the pistons on the inward movement of the operating piston, a shoulder for limiting the inward movement of the spring pressed piston, a by-pass for permitting the escape of the fluid from between said pistons, a port in said operating piston controlling said by-pass and preventing the escape of fluid from between said pistons until said operating piston has nearly reached the inner limit of the movement whereby the fluid between the pistons is placed under pressure and the inward movement of the operating piston is opposed, and means for gradually dissipating or reducing said opposing pressure.

3. In a clutch controller for use with a clutch having cooperating clutch elements normally held in cooperative relation by pressure means and adapted to be released against the pressure of said pressure means, the combination of a closed casing for containing a fluid, a rotatable operative shaft entering the casing, means for preventing the escape of fluid along the shaft, a cylindrical bore in the casing, a piston in one end of the bore, a crank within the casing rotatably secured on said shaft, a link connecting the free end of the crank with said piston for moving the piston back and forth, a second piston in the opposite end of said bore, a spring within the casing for yieldingly holding the second piston at the inner limit of its movement, a stop for limiting the inward movement of the second piston, a passage in the wall of the casing connecting the outer ends of said bore, a check valve in the first piston for permitting it to move freely away from the second piston, and thereby trap liquid between the pistons, the inward movement of the first piston caused by said pressure means in re-engaging the clutch elements forcing the second piston outwardly against the resistance of said spring, said spring adapted to substantially counterbalance said pressure means at its point of greatest compression, and means governed by the first piston for permitting the escape of the liquid from between the pistons when the first piston nears the inner limit of its movement and said clutch elements are brought into initial contact, thereby gradually reducing the resistance of said spring, and permitting the first piston to move to the inner limit of its movement and permit the full action of said pressure means upon said clutch elements, and means for regulating the rate of escape of fluid from between the pistons.

4. In a clutch controller for use with a clutch having friction clutch elements normally held in engaging relation by spring means and adapted to be released against the pressure of said spring means for disengaging said clutch elements, the combination of a substantially closed casing adapted to contain an operating fluid, an operating shaft entering said casing, means preventing the escape of fluid along the shaft, the casing having a cylindrical bore, an operating piston in the bore operatively connected to said shaft, an opposed piston in the bore, a spring within the casing arranged to hold said second piston inwardly, a stop limiting the inward movement of the spring pressed piston, a spring controlled check valve permitting the free outward movement of said operating piston, an uncontrolled by-pass connecting the outer ends of said cylindrical bore, a by-pass connecting the space between the pistons with the casing beyond the pistons, means preventing the flow of fluid through said second by-pass until the operating piston approaches the inner limit of its movement, means adjustable from without the casing for regulating the flow of fluid through said second by-pass, and means preventing the escape of fluid along said adjusting means.

5. The improvements herein described, comprising a friction clutch having co-operating clutch elements, a main clutch spring for closing the clutch elements, a lever system for opening the clutch, a controller having a spring creating a force to counterbalance said clutch spring before engagement of said clutch elements, said controller having a crank arm connected with said lever system for controlling the engagement of the clutch elements, said crank arm having a longitudinal slot, a removable plate filling the slot, said plate having a hole to receive a pin for connecting said crank to the lever system, said plate being removable to permit the insertion of another plate having a hole in a different relation for changing the effective length of the crank whereby the magnitude of said force may be varied.

6. In a clutch controller for use with a clutch having cooperating clutch elements normally held in cooperative relation by a clutch spring and adapted to be released against the pressure of said clutch spring, the combination of a lever mechanism for disengaging the clutch elements, a controller comprising a closed casing, a first piston movable in the casing and adapted to be connected with the clutch, a counterbalancing spring within the casing, a second piston for compressing the spring, the casing adapted to contain a liquid which acts as a variable piston between said pistons, said counterbalancing spring serving as a continuously varying resistance to said clutch spring whereby the latter will have minimum effect at time of initial engagement to close said clutch elements, and means for adjusting the effect of said counterbalancing spring against said clutch spring to control the time of effective engagement after initial movement.

7. In a clutch controller for use with a clutch having cooperating clutch elements normally held in cooperative relation by pressure means and adapted to be released against action of said pressure means, said elements being re-engaged after a preponderating action of said pressure means, the combination of a closed casing, a piston movable in the casing and adapted to be connected with the clutch, a counterbalancing spring within the casing, a piston for compressing the spring, the casing adapted to contain a liquid which acts as a variable piston between said first and second pistons, means for adjusting the position of said first piston in said casing relative to the position of said clutch elements, and means for adjusting the length of stroke of said first piston.

8. In a clutch controller for use with a clutch having cooperating clutch elements normally held in cooperative relation by pressure means and adapted to be released against action of said pressure means, said elements being re-engaged after a preponderating action of said pressure means, the combination of a closed casing, a piston within the casing adapted to be connected with said clutch, and adapted to be moved back and forth in the casing when the clutch is released and engaged, a second piston movable in the casing, a spring compressed by the outward movement of said second piston, the casing adapted to contain a liquid which acts as a pressure transmitting medium between said pistons, a crank arm affording operative connection between the controller and the clutch, and means for adjusting the effective length of radius arm of said crank for effecting a greater or less compression of said spring within the casing.

9. In a clutch controller for use with a clutch having cooperating clutch elements normally held in cooperative relation by pressure means and adapted to be released against the action of said pressure means, the combination of a casing adapted to contain an operating fluid, said casing having a cylindrical bore, an operating piston in one end of the bore, a spring pressed piston in the other end of the bore, a check valve permitting the free outward movement of the operating piston and preventing the escape of fluid from between the pistons on the inward movement of the operating piston, by-pass means for permitting the escape of fluid from between the pistons, said by-pass means being arranged to permit an increasing escape of fluid as the spring pressed piston nears the inner limit of its movement.

10. In a clutch controller for use with a clutch having cooperating clutch elements normally held in cooperative relation by pressure means and adapted to be released against the action of said pressure means, the combination of a closed casing adapted to contain an operating fluid, said casing having a cylindrical bore, an operating piston in one end of the bore, a spring pressed piston in the opposite end of the bore, a check valve permitting the free outward movement of the operating piston and preventing the escape of fluid from between the pistons on the inward movement of the operating piston, a by-pass for permitting the escape of fluid from between the pistons, a port in said operating piston controlling said by-pass, and preventing the escape of fluid from between said pistons until said operating piston has nearly reached the inner limit of its movement, whereby the fluid between the pistons is placed under pressure and the inward movement of the operating piston is opposed, and a second by-pass adapted to permit an increasing flow of the fluid from between the pistons as they approach the inner limit of their movements.

11. In a clutch controller for use with a clutch having cooperating clutch elements normally held in cooperative relation by pressure means and adapted to be released against the action of said pressure means, the combination of a casing adapted to be filled with an operating liquid, two opposed pistons in the casing, one operatively connected to the clutch to be controlled, the other piston being yieldingly held at one limit of its movement by spring pressure, one of said pistons having a liquid opening, an elongated plug filling said opening and provided with a longitudinally extending tapered groove permitting an increasing flow of the liquid from the space between the pistons as the two pistons approach each other.

12. In a clutch controller for use with a clutch having cooperating clutch elements normally held in cooperative relation by pressure means and adapted to be released against the pressure of said pressure means, the combination of a closed casing adapted to be filled with liquid, opposed pistons in the casing, one operatively connected to the clutch to be controlled, and the other piston being yieldingly held at the inner limit of its movement by a spring, one of said pistons having a liquid opening, a stem carried by the opposite piston and slidable through said opening and adapted to prevent escape of the fluid when the spring pressed piston is at the outer limit of its movement, a tapered groove in said stem adapted to permit an increasing flow of fluid from the space between the pistons as the spring pressed piston approaches the inner limit of its movement.

In witness whereof, I hereunto subscribe my name this 11th day of June, A. D. 1919.

JAMES S. MANTON.